United States Patent
Chinnamani et al.

(10) Patent No.: US 9,858,097 B2
(45) Date of Patent: Jan. 2, 2018

(54) METHODS, DEVICES AND COMPUTER READABLE STORAGE DEVICES FOR EMULATING ROTATION EVENTS IN A GUEST OPERATING SYSTEM FROM A HOST OPERATING SYSTEM

(71) Applicant: American Megatrends, Inc., Norcross, GA (US)

(72) Inventors: Sripriyan Chinnamani, Duluth, GA (US); Vinothkumar Sundaramoorthy, Lawrenceville, GA (US); Govind Kothandapani, Snellvile, GA (US); Anbarasu Sethupandian, Suwanee, GA (US); Rajasekhar Jonna, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 0 days.

(21) Appl. No.: 14/290,702

(22) Filed: May 29, 2014

(65) Prior Publication Data

US 2014/0366025 A1   Dec. 11, 2014

Related U.S. Application Data

(63) Continuation-in-part of application No. 14/155,471, filed on Jan. 15, 2014, now abandoned.
(Continued)

(51) Int. Cl.
G06F 9/455 (2006.01)

(52) U.S. Cl.
CPC ............. *G06F 9/45545* (2013.01); *G06F 2009/45579* (2013.01)

(58) Field of Classification Search
CPC ............. G06F 9/45545; G06F 2009/45579
See application file for complete search history.

(56) References Cited

U.S. PATENT DOCUMENTS 6,996,828 B1   2/2006 Kimura et al.
8,863,123 B2   10/2014 Jung
(Continued)

OTHER PUBLICATIONS

Chinnamani et al. "Methods, Devices and Computer Readable Storage Devices for Emulating a Magnetometer in a Guest Operating System from a Host Operating System", U.S. Appl. No. 14/290,562, filed May 29, 2014.
(Continued)

*Primary Examiner* — Li B Zhen
*Assistant Examiner* — Amir Soltanzadeh
(74) *Attorney, Agent, or Firm* — Jennifer P. Medlin

(57) ABSTRACT

A guest operating system is provided with access to sensor data indicative of a rotation event from sensors associated with a computing device including a processor executing a host operating system. The guest operating system is launched as a virtual operating system and is executed as a guest of the host operating system. Responsive to changed sensor data indicative of the rotation event detected by at least one sensor associated with the computing device, the changed sensor data is sent to a first application associated with the host operating system via at least one driver executing within a kernel of the host operating system. The changed sensor data is sent from the first application to an application framework associated with the guest operating system. The application framework calculates rotation of the computing device based on the changed sensor data. The calculated rotation is sent to a second application associated with the guest operating system.

17 Claims, 3 Drawing Sheets

Related U.S. Application Data

(60) Provisional application No. 61/832,285, filed on Jun. 7, 2013.

(56) References Cited

U.S. PATENT DOCUMENTS

| | | | |
|---|---|---|---|
| 2002/0194241 A1* | 12/2002 | Griffin | G06F 9/45537 718/1 |
| 2003/0037089 A1 | 2/2003 | Cota-Robles | |
| 2004/0123103 A1 | 6/2004 | Risen et al. | |
| 2005/0015702 A1 | 1/2005 | Shier et al. | |
| 2006/0146057 A1 | 7/2006 | Blythe | |
| 2006/0150183 A1 | 7/2006 | Chinya et al. | |
| 2006/0206904 A1 | 9/2006 | Watkins | |
| 2007/0294690 A1 | 12/2007 | Taillerfer | |
| 2007/0300221 A1 | 12/2007 | Hartz | |
| 2009/0083630 A1 | 3/2009 | Peterson | |
| 2009/0113110 A1 | 4/2009 | Chen | |
| 2009/0328074 A1 | 12/2009 | Oshins | |
| 2010/0103186 A1 | 4/2010 | Luengen | |
| 2010/0107163 A1 | 4/2010 | Lee | |
| 2010/0118169 A1 | 5/2010 | Yu | |
| 2010/0138685 A1 | 6/2010 | Kass | |
| 2010/0146504 A1 | 6/2010 | Tang | |
| 2011/0061053 A1 | 3/2011 | Coppinger | |
| 2011/0088031 A1* | 4/2011 | Takahashi | G06F 9/5077 718/1 |
| 2011/0093836 A1 | 4/2011 | Galicia et al. | |
| 2011/0145916 A1 | 6/2011 | McKenzie et al. | |
| 2012/0072923 A1 | 3/2012 | Robles | |
| 2012/0089992 A1 | 4/2012 | Reeves | |
| 2012/0124595 A1 | 5/2012 | Hsu | |
| 2012/0138685 A1 | 6/2012 | Du | |
| 2012/0198480 A1* | 8/2012 | Yasaki | G06F 9/45533 719/319 |
| 2012/0206331 A1 | 8/2012 | Gandhi | |
| 2012/0296626 A1 | 11/2012 | Bond | |
| 2013/0031592 A1 | 1/2013 | Choi | |
| 2013/0061250 A1 | 3/2013 | Kothandapani et al. | |
| 2013/0158928 A1* | 6/2013 | Hogdal | G01C 21/20 702/104 |
| 2013/0185716 A1 | 7/2013 | Yin | |
| 2013/0219086 A1 | 8/2013 | Hu | |
| 2013/0226505 A1* | 8/2013 | Kelly | G01P 7/00 702/141 |
| 2013/0326508 A1 | 12/2013 | Tsirkin | |

OTHER PUBLICATIONS

Chinnamani et al. "Methods, Devices and Computer Readable Storage Devices for Emulating a Gyroscope in a Guest Operating System from a Host Operating System", U.S. Appl. No. 14/290,605, filed May 29, 2014.

Chinnamani et al. "Methods, Devices and Computer Readable Storage Devices for Emulating an Accelerometer in a Guest Operating System from a Host Operating System", U.S. Appl. No. 14/290,505, filed May 29, 2014.

Chinnamani et al. "Methods, Devices and Computer Readable Storage Devices for Emulating a Light Senor in a Guest Operating System from a Host Operating System", U.S. Appl. No. 14/290,656, filed May 29, 2014.

Architecture of Windows NT, http://en.wikipedia.org/wiki/Architecture_of_Windows_NT, 9 pp (Printed Aug. 9, 2011).

Android Architecture, http://blog.zeustek.com/2010/11/11/android-architecture, 6 pp (Printed Jul. 14, 2011).

Ammann, Paul T., "Windows 200 Architecture", www.informit.com/articles, 3pp (Apr. 13, 2001).

Wright, Maury, "Why Android Deserves a Look in Embedded Wireless Systems", www.digkey.com, 2pp (Printed Jul. 1, 2011).

Levent-Levi, Tsahi, "iOS, Android, Windows Phone 7 and the Great Changes in the Operating Systems Market", http://blog.radvision.com/voipsurvivor, 5pp (Oct. 7, 2010).

Woods, Ben, "Hands-on with Samsung's hybrid Windows 8 and Android Galaxy ATIV Q", http://thenextweb.com, 3 pp (Jun. 21, 2013).

BlueStacks—Technology, www.bluestacks.com/technology, 3pp (Printed Jul. 15, 2013).

Samsung Strengthens Tablet Business and Demonstrates Commitment to Customer Choice with Innovative New ATIV Tablets, www.samsung.com, 2pp (Printed Jul. 15, 2013).

Chinnamani et al. "Methods, Devices and Computer Readable Storage Devices for Emulating a Magnetometer in a Guest Operating System from a Host Operating System", patent application to be filed with USPTO by May 30, 2014.

Chinnamani et al. "Methods, Devices and Computer Readable Storage Devices for Emulating an Accelerometer in a Guest Operating System from a Host Operating System", patent application to be filed with USPTO by May 30, 2014.

Chinnamani et al. "Methods, Devices and Computer Readable Storage Devices for Emulating a Light Sensor in a Guest Operating System from a Host Operating System", patent application to be filed with USPTO by May 30, 2014

Chinnamani et al. "Methods, Devices and Computer Readable Storage Devices for Emulating a Gyroscope in a Guest Operating System from a Host Operating System", patent application to be filed with USPTO by May 30, 2014.

Kothandapani et al., U.S. Appl. No. 14/155,471, filed Jan. 15, 2014 entitled Methods, Devices and Computer Readable Storage Devices for Confluence of Multiple Operating Systems.

Jie Song; "The Design of Bottom Layer Sensor Interfaces Based on Andriod OS", 2012 4th International Conference on Signal Processing Systems, Singapore (Song_2012.pdf; pp. 1-7).

STMicroelectronics; "Hardware abstraction layer for Android", Sep. 2012; (Sensor_HAL_2012.pdf; pp. 1-12).

Benjamin Zores; "Jelly Bean Device Porting Walkthrough" Alcatel-Lucent, 18th Feb. 2013, (AlCATEL-LUCENT_2013.pdf; pp. 1-127).

Kaur et al.; "Exposing the Android Camera Stack" Aptina Imaging Corporation Aug. 28, 2012; (Kaur_2012.pdf; pp. 1-68).

* cited by examiner

METHODS, DEVICES AND COMPUTER READABLE STORAGE DEVICES FOR EMULATING ROTATION EVENTS IN A GUEST OPERATING SYSTEM FROM A HOST OPERATING SYSTEM

CROSS REFERENCE TO RELATED APPLICATIONS

This application claims priority to U.S. Provisional Appl. No. 61/832,285, filed Jun. 7, 2013, and herein incorporated by reference. In addition, this application claims priority as a Continuation-in-part of U.S. patent application Ser. No. 14/155,471, filed Jan. 15, 2014, and herein incorporated by reference.

TECHNICAL FIELD

The present disclosure relates generally to computing systems, and more particularly, to providing a guest operating system with access to rotation events detected by sensors on a computing device.

BACKGROUND

A tablet computer, which may be simply referred to as a tablet, is a one-piece mobile computer. Tablet computers typically offer a touchscreen, with finger (or stylus) gestures acting as the host means of user interface control. The tablet may be supplemented with one or more physical context sensitive buttons or the input from one or more sensors, e.g., accelerometers, as a means for control. An on-screen, hideable virtual keyboard is generally offered as the principal means of data input. Though available in a variety of sizes, tablets customarily offer a screen diagonal greater than 7 inches (18 cm), differentiating the tablets through size from functionally similar smart phones or personal digital assistants.

Most tablets have built-in sensors that measure motion, orientation, and various environmental conditions. These sensors are capable of providing raw data with high precision and accuracy and are useful for monitoring three-dimensional device movement or positioning or monitoring changes in the ambient environment near a device. For example, a game running on a tablet might track readings from the tablet's gravity sensor to infer complex user gestures and motions, such as tilt, shake, rotation, or swing. Likewise, a weather application might use the tablet's temperature sensor and humidity sensor to calculate and report the dew point, or a travel application might use the tablet's geomagnetic field sensor and accelerometer to report a compass bearing.

In today's world, having dual mobile operating systems in devices, such as laptops, has become more common as people want to have access to features of multiple operating systems. Windows has been the host operating system for most laptops, along with Linux based operating systems. Recently, with the increase in popularity of Android in smartphones, a trend is emerging pushing Android as a guest operating systems in tablets, notebooks and netbooks. Since Android has the advantage of a mature application market, along with developer support, there is an increasing push from the market to run Android in parallel with Windows.

The Android OS platform supports three broad categories of sensors: environmental sensors, position sensors, and motion sensors. Environmental sensors measure various environmental parameters, such as ambient air temperature and pressure, illumination, and humidity. Environmental sensors include, e.g., barometers, photometers, and thermometers. Position sensors measure the physical position of a device. Position sensors include, e.g., orientation sensors and magnetometers. Motion sensors measure acceleration forces and rotational forces along three axes. Motion sensors include, e.g., accelerometers, gravity sensors, gyroscopes, and rotational vector sensors.

A Dual Operating System (DuOS) allows an Android OS to work alongside a host OS, e.g., a Windows OS, in a tablet and other types of computing devices, e.g., mobile communication devices, personal digital assistants, and personal computers. DuOS enables the user of a Windows OS computing device to run an Android OS in the same computing device and to use the thousands of applications available in Android. Details of exemplary DuOS devices are provided in U.S. patent application Ser. No. 13/233,473, filed Sep. 2, 2011 and U.S. patent application Ser. No. 14/155,471, filed Jan. 15, 2014, herein incorporated by reference.

In an Android operating system that is not part of a DuOS computing device, an Android application sends requests for access to the hardware, and the requests are fulfilled by the Linux drivers.

However, in existing DuOS computing devices, in which the Android OS is executed as a guest of the Windows OS, when the Window OS boots the computing device, the Windows OS enumerates and takes over the hardware. Later, when DuOS is launched from within the Windows OS, the Android OS is run in the Windows OS as a process. An attempt by an Android application to access the hardware through Linux drivers in such a device would fail as it would be transparent to the Windows OS, because such access is outside of the scope of the Windows OS.

It is with respect to these and other considerations that the disclosure presented herein has been made.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

According to an illustrative embodiment, a method is provided for providing a guest operating system with access to sensor data from sensors associated with a computing device including a processor executing a host operating system. The guest operating system is launched as a virtual operating system and is executed as a guest of the host operating system. The method includes detecting changed sensor data indicative of a rotation event by at least one of the sensors, retrieving the changed sensor data, and sending the changed sensor data to a first application associated with the host operating system. The changed sensor data is sent to the first application via at least one driver executing within a kernel of the host operating system. The method further includes sending the changed sensor data from the first application to an application framework associated with the guest operating system. The application framework calculates rotation of the computing device based on the changed sensor data.

According to another embodiment, a computing device having associated sensors is provided. The computing device includes a processor and a memory. The memory has stored thereon instructions which, when executed by the processor, cause the processor to perform operations. The operations include executing a host operating system and executing an application for launching a guest operating system. The guest operating system is a virtual operating system and is executed as a guest of the host operating system. The operations further include detecting changed sensor data indicative of the rotation event by at least one of the sensors, retrieving the changed sensor data, and sending the changed sensor data to a first application associated with the host operating system via at least one driver executing within a kernel of the host operating system. The operations further include sending the changed sensor data from the first application to an application framework associated with the guest operating system. The application framework calculates rotation of the computing device based on the changed sensor data.

According to another embodiment, a computer readable storage device included in a computing device has instructions stored thereon which, when executed by a processor, cause the processor to perform operations. The operations include executing a host operating system and executing an application for launching a guest operating system. The guest operating system is a virtual operating system and is executed as a guest of the host operating system. The operations further include detecting changed sensor data indicative of a rotation event by at least one sensor associated with the computing device, retrieving the changed sensor data, and sending the changed sensor data to a first application associated with the host operating system via at least one driver executing within a kernel of the host operating system. The operations further include sending the changed sensor data from the first application to an application framework associated with the guest operating system. The application framework calculates rotation of the computing device based on the changed sensor data.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

Although this disclosure refers to a tablet, it should be appreciated that the embodiments described herein may be applicable to any mobile computing device having built-in sensors, such as an accelerometer, a gyroscope, and a magnetometer. An accelerometer measures the acceleration force in $m/s^2$ that is applied to a device on all three physical axes (x, y, and z), including the force of gravity. An accelerometer is used by a motion detection application to detect, e.g., shake, tilt, etc., of the mobile computing device. A magnetometer measures the ambient geomagnetic field for all three physical axes (x, y, and z) in $\mu T$. The magnetometer is used by a position detection application to create a compass reading for, e.g., a mobile computing device. A gyroscope measures a rate of rotation of a device, such as a mobile computing device, in rad/s around each of the three physical axes (x, y, and z). A gyroscope may be used by a rotation detection application to detect spin, turn, etc., of the mobile computing device.

As the orientation of a computing device changes, e.g., as the device rotates, data from the accelerometer, the gyroscope, and/or the magnetometer changes. This changed data may be used to calculate the rotation/orientation of the computing device. A screen rotation application may then use the calculated rotation data to rotate the screen to accommodate for the change in orientation of the computing device.

Figure 1:
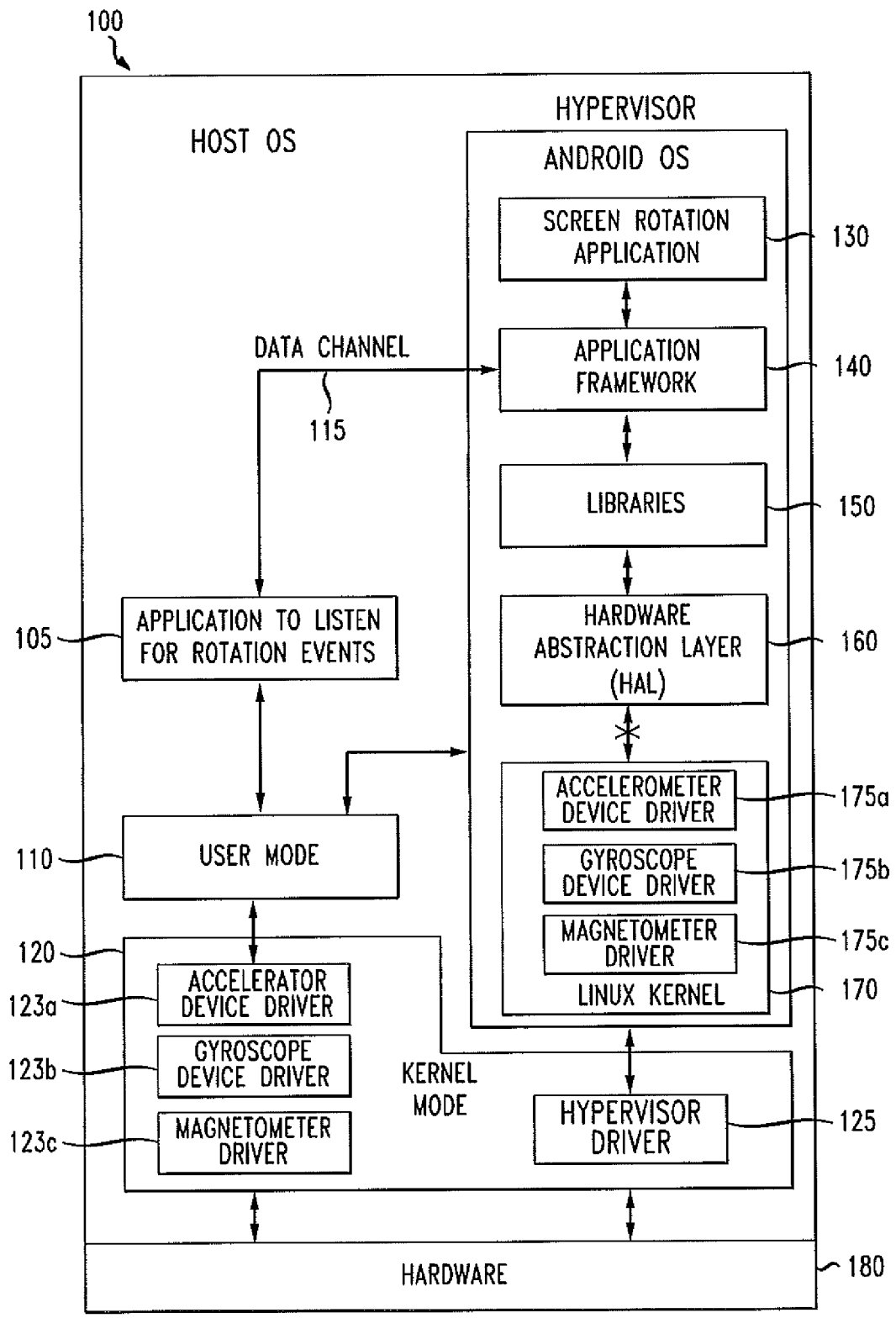
FIG. 1 is a diagram of a dual operating system architecture for emulating rotation events in a guest operating system from a host operating system according to illustrative embodiments.

FIG. 1 illustrates a DUOS architecture 100 for emulating an accelerometer in a guest operating system from a host operating system according to an illustrative embodiment. The DuOS architecture 100 includes guest operating system architecture (in this example Android architecture) and host operating system architecture (in this example Windows architecture). The Windows architecture shown in FIG. 1 represents an example of a Windows 8 operating system. However, it should be appreciated that the other versions of Windows are contemplated.

The Windows architecture operates in two modes. These two modes are represented in FIG. 1 as the kernel mode 120 and the user mode 110. The user mode includes user applications, such as Win32 applications, Windows 3.1, MS-DOS, POSIX, OS/2 applications, etc. The applications may also include various other user applications, e.g., applications to read data from sensors built into the computing device, such as an application 105 to listen for rotation evens. Although shown as being separate from the user mode 110 for ease of understanding, it should be appreciated that the applications are included in the user mode 110.

The user mode 110 may also include a Windows Application Programming Interface (API) (not shown for simplicity of illustration). The Windows API may provide access to services, such as sensor services, control services and metro shortcut services.

In the user mode, software is not able to access the hardware 180 directly. Access to hardware is provided to the user mode 110 via the kernel mode 120. In the kernel mode 120, software is able to access the hardware and system data, as well as access all other system resources, including sensors.

The kernel mode 120 may include exported driver support routines including the operating system kernel (also referred to as the microkernel), file system drivers, other kernel-mode drivers, such as sensor drivers 123a, 123b, and 123c, and a Windows hardware abstraction layer (HAL). The file system drivers and the other kernel-mode drivers enable the kernel layer 120 to interact with the hardware layer 180 via the Windows hardware abstraction layer.

Although not shown in the interest of simplicity of illustration, it should be appreciated that the kernel mode 120 may also include additional components, e.g., executive layer components. These components may include components that implement memory management, process and thread management, security, I/O, interprocess communication, and other base operating system services.

The Windows hardware abstraction layer includes code associated with the Windows operating system that changes with the hardware that the operating system is being run on. Thus, it is compatible with multiple processor platforms. The Windows hardware abstraction layer manipulates the hardware 180 directly.

The hardware layer 180 includes physical hardware including, e.g., a hard drive for storing data, a processor for executing applications, and a memory which may include an operating system which controls scheduling of tasks and access to system resources. The physical hardware also includes sensors, such as an accelerometer, a magnetometer, and a gyroscope.

The Android architecture depicted in FIG. 1 represents a virtual operating system that is launched by executing be a Windows application which may be referred to as virtual software or a hypervisor. Executing the hypervisor creates an instance of a virtual machine on which a guest operating system, e.g., an Android OS, can be run in a manner that is transparent to the end user. The hypervisor operates in the user mode and cannot access hardware directly. Thus, a hypervisor driver 125 is included in the kernel mode 120 to provide low-level hardware access for the Android OS for execution of machine level instructions.

As shown in FIG. 1, the Android OS includes a software stack including an applications layer 130, an application framework layer 140, a libraries layer 150, a hardware abstraction layer (HAL) 160, and a kernel layer 170. The applications layer 130 includes various applications, which may be written in JAVA.

The application framework 140 is used by developers to access framework application programming interfaces (APIs) and manage the basic functions of a mobile device, laptop, or tablet on which Android is executed, such as resource allocation, switching between processes or programs, phone applications, and keeping track of the physical location of the phone/laptop/tablet. The application framework 140 includes various managers, including an activity manager, a window manager, a content provider manager, a view system manager, a package manager, a telephony manager, a resource manager, a location manager, and a notification manager.

The library layer 150 includes libraries written, e.g., in C, C++, etc., and is used by various systems. The libraries instruct the device executing Android how to handle different kinds of data and are exposed to Android developers via the application framework 140. Libraries may include, e.g., a surface manager, a media framework library, an SQLite library, an Open GL/ES library, a Free Type library, a WebKit library, an SGL library, an SSL library, and an libe library.

An Android runtime layer, which includes a set of core libraries and a Dalvik Virtual Machine (DVM), may also be located in the library layer 150. The runtime layer includes the set of base libraries that are required for JAVA libraries.

The hardware abstraction layer 160 provides a standard way to create software hooks in between the Android platform stack and the hardware 180. The hardware abstraction layer 160 also acts as an abstraction layer between the hardware 180 and the rest of the software stack.

The Linux kernel layer 170 includes Android memory management programs, security settings, power management software and several drivers, such as the device drivers 175*a*, 175*b*, and 175*c* for hardware, file system access, networking, and inter-process-communication.

According to an illustrative embodiment, a request from a Windows application, e.g., application 105, is routed to the driver in the kernel mode which accesses the hardware 180. In general, an Android application running on an Android device that uses a sensor reads the sensor data using the Linux drivers of the Android device.

However, as noted above, when DUOS is launched from within the Windows OS, the Android OS is run in the Windows OS as a process. Any attempt by an Android application to access the hardware 180 through the Linux drivers 175*a*, 175*b*, and or 175*c* in such a device would be transparent to the Windows OS, because such access is outside of the scope of the Windows OS. Thus, a request for data from an Android application 130 would not be sent from the HAL 160 to the Linux kernel 170, as represented by the "X" in FIG. 1, and the Linux kernel drivers 175*a*, 175*b*, and 175*c* would be unable to fulfill the request. This would result in an undefined state or malfunctioning of the hardware, According to an illustrative embodiment, a request for access to the hardware 180 by an Android application, such as a request for data indicative of rotation events from the screen rotation application 130 is not routed to the Linux kernel 170. Rather, the Windows application 105 listens for changes in sensor data indicative of rotation events by an accelerometer, a gyroscope, and a magnetometer included in the hardware 180. The application 105 is an application associated with the Windows OS, which is executed by the processor in a user mode layer associated with the host Windows OS. Through the application 105, applications of the Android operating system are able to access the hardware and system data of the Windows OS, including a built-in sensors, such as an accelerometer, a magnetometer, and a gyroscope.

According to illustrative embodiments, changes in sensor data are detected, and the changed sensor data is retrieved and sent to the application 105 via drivers operating in the kernel mode 120. In particular, changes in acceleration detected by the accelerometer are retrieved from the accelerometer and send to the application 105 via the accelerometer driver 123*a*. Changes in the ambient geomagnetic field detected by the magnetometer are retrieved from the magnetometer and sent to the application 105 via the magnetometer driver 123*b*. Changes in the rate of rotation of the computing device detected by the gyroscope are retrieved from the gyroscope and sent to the application via the gyroscope driver 123*c*. The drivers 123*a*, 123*b*, and 123*c* access the accelerator, the magnetometer, and the gyroscope via a hardware abstraction layer of the Windows OS The changed sensor data indicative of a rotation event is sent from the Windows application 105 to the application framework 140 via a data channel 115. The data channel 115 may be implemented with a bus, a pipe, a message queue, a file, a shared memory, a socket, etc.

According to an illustrative embodiment, the application framework calculates the rotation of the computing device based on the changed sensor data received from the application 105. This calculation may be performed in conjunction with the libraries 150. Once the rotation of the computing device is calculated, the application works expected to adjust the screen rotation.

As noted above, the architecture 100 may be included in a device, such as a tablet. However, the architecture may also be included in other devices, e.g., a workstation, a telephone, a desktop computer, a laptop, a notebook computer, a server, a handheld computer, a media playing device, a gaming system, a mobile computing device, or any other type and/or form of computing, telecommunications, or media device that is capable of communication.

Figure 2:
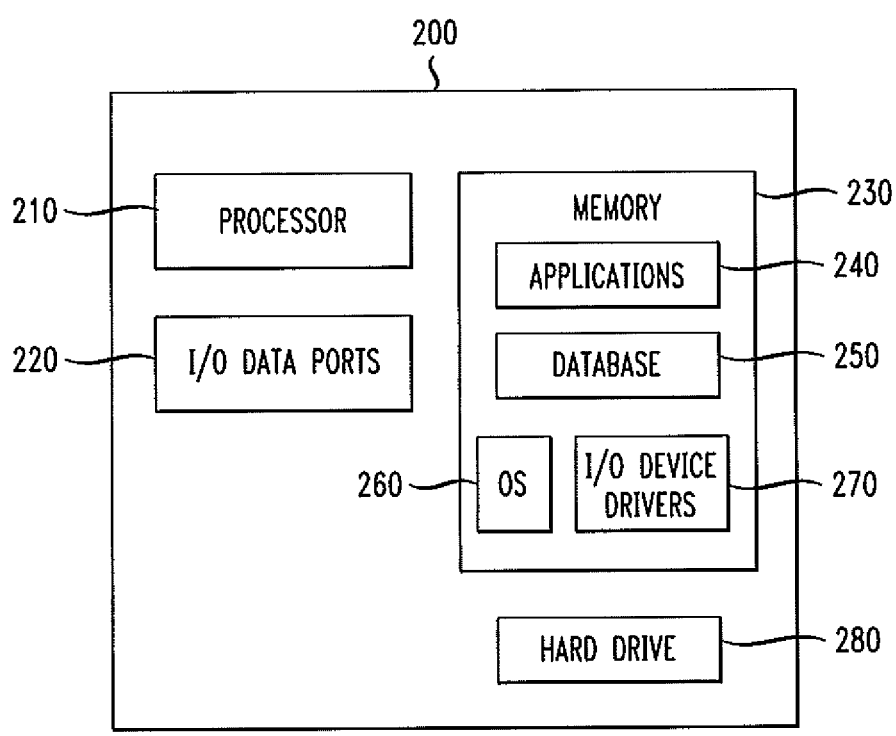
FIG. 2 is a block diagram of a computing device with which illustrative embodiments may be implemented.

FIG. 2 is a block diagram of a computing device 200 with which the software architecture of FIG. 1 may be implemented. The computing device 200 may be included within a device, such as a notebook or tablet. Referring to FIG. 2, the computing device 200 includes a processor 210 that receives inputs, e.g., user requests, and transmits outputs, e.g., responses to user requests via I/O Data Ports 220. The I/O Data Ports 220 can be implemented with, e.g., an interface through which data and signals may be transmitted and received wired and/or wirelessly.

The computing device 200 also includes a physical hard drive 280. The processor 210 communicates with the memory 230 and the hard drive 280 via, e.g., an address/data bus (not shown). The processor 210 can be any commercially available or custom microprocessor. The memory is 230 is representative of the overall hierarchy of memory devices containing the software and data used to implement the functionality of the device 200. The memory 230 can include, but is not limited to, the following types of devices: processor registers, processor cache, RAM, ROM, PROM, EPROM, EEPROM, flash memory, SRAMD, DRAM other volatile memory forms, and non-volatile, semi-permanent or permanent memory types, excluding propagating signals. For example, the memory may include tape-based media, optical media, solid state media, hard disks, combinations thereof, and the like.

As shown in FIG. 2, the memory 230 may include several categories of software and data used in the device 200, including applications 240, a database 250, an operating system (OS) 260, and input/output (I/O) device drivers 270. The applications 240 include various programs that implement the various features of the device 200, including, e.g., a hypervisor for emulating physical hardware to a virtual operating system acting a guest operating system, e.g., the Android OS. The applications 240 may also include user applications, e.g., an application for listening for rotation events and other applications. The memory 230 may also include services, which may be considered a special category of applications 240.

As will be appreciated by those skilled in the art, the OS 260 may include code for any operating system for use with a data processing system, e.g., a Windows OS. According to an illustrative embodiment, the Windows OS is the run as the host operating system, while an Android OS is run as a virtual operating system acting as a guest of the host operating system. The Android OS is launched by executing a hypervisor application. The Android OS may be stored as a file within the memory 230. The Android OS file is emulated as a hard disk for the guest operating system. Running the Android OS using virtualization ensures that portions of the Android OS that need to run in a system mode, e.g., the kernel and the device driver, are run in the system mode of the host OS (in this case the Windows OS).

The I/O device drivers 270 may include various routines accessed through the OS 260 by the applications to communicate with devices and certain memory components. According to an illustrative embodiment, the device drivers may include, e.g., a driver for accessing an accelerometer, a driver for accessing a magnetometer, and a driver for accessing a gyroscope (not shown in FIG. 2 for simplicity of illustration).

The applications 240 can be stored in the memory 230 and/or in a firmware (not shown) as executable instructions, and can be executed by the processor 210. The database 250 represents the static and dynamic data used by the applications 240, the OS 260, the I/O device drivers 270 and other software programs that may reside in the memory.

It should be understood that FIG. 2 and the description above are intended to provide a brief, general description of a suitable environment in which the various aspects of some embodiments of the present disclosure can be implemented. While the description refers to computer-readable instructions, the present disclosure also can be implemented in combination with other program modules and/or as a combination of hardware and software in addition to, or instead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like. The terminology "computer-readable media", "computer-readable storage device" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information, excluding propagating signals.

Figure 3:
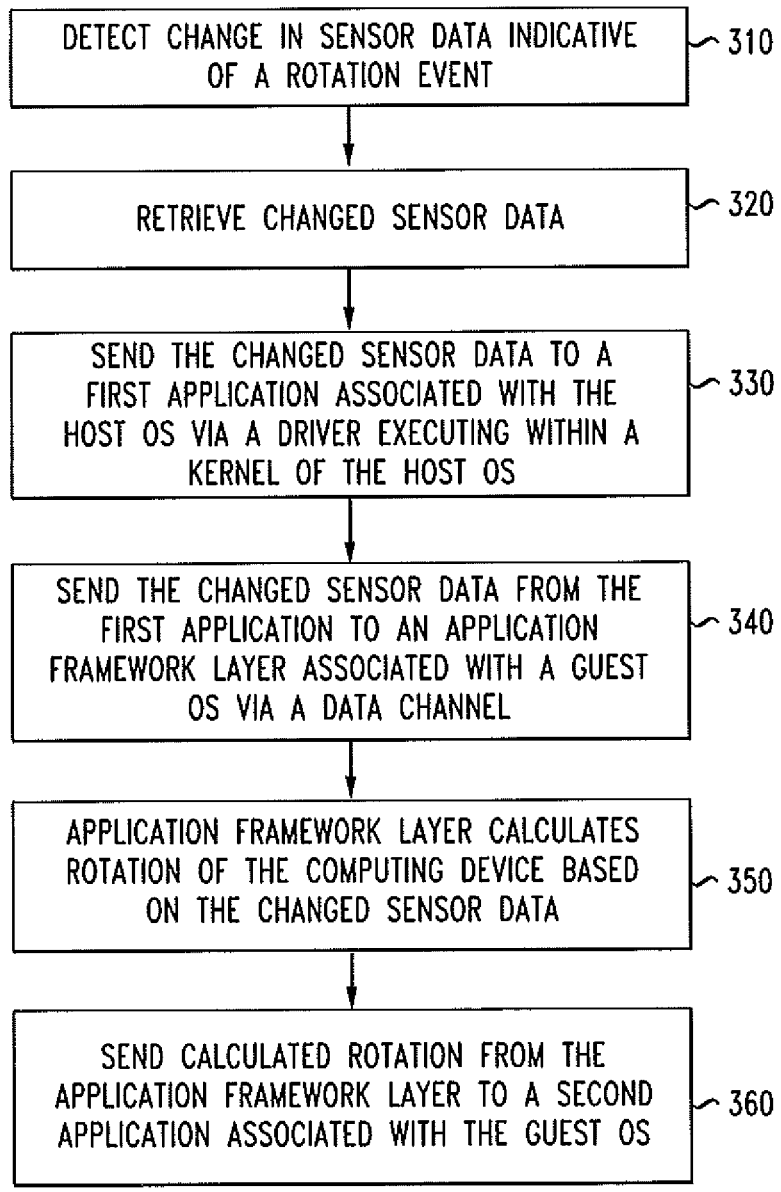
FIG. 3 is a flow chart illustrating a method for emulating rotation events in a guest operating system from a host operating system according to an illustrative embodiment.

FIG. 3 illustrates a method for emulating rotation events in a guest operating system from a host operating system according to an illustrative embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on computer-readable storage device, excluding a propagating signal.

Referring to FIG. 3, a change in data from at least one sensor including, e.g., an accelerometer, a magnetometer, and/or a gyroscope is detected, e.g., by the sensor, at step 310. At step 320, the changed sensor data is retrieved from the sensor(s) via at least one driver executing within a kernel of a host OS, e.g., the accelerometer driver 123a, the magnetometer driver 123b and/or the gyroscope driver 123c. At step 330, the changed sensor data is sent to a first application associated with a host OS, e.g., the application to listen for rotation events 105. At step 340, the changed sensor data is sent from the first application associated with the host OS to an application framework associated with a guest OS. The guest OS is a virtual operating system executing as a guest of the host OS. At step 350, the application framework e.g., the application framework 140 calculates rotation of the computing device based on the changed sensor data. At step 360, the calculated rotation data is sent to a second application associated with the guest operating system, e.g., the screen rotation application 130. The screen rotation application causes the screen to rotate based on the calculated rotation of the computing device.

Although not shown, it should be appreciated that a request from an application associated with the host operating system, e.g., the Windows OS, for accessing resources associated with the host operating system may be fulfilled in a conventional way, e.g., by routing the request from a driver to the hardware via the hardware abstraction layer and fulfilling the request via the hardware abstraction layer and the driver.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for providing a guest operating system with access to sensor data from sensors associated with a computing device including a processor executing a host operating system, comprising:
    launching the guest operating system, wherein the guest operating system is a virtual operating system and is executed as a guest process of the host operating system, such that the guest operating system does not have access to a driver executing within a kernel of the host operating system;
    detecting, by the driver executing within the kernel of the host operating system, changed sensor data indicative of a rotation event detected by at least one of the sensors;
    retrieving the changed sensor data;
    sending the changed sensor data to a first application included within a user mode of the host operating system;
    sending the changed sensor data from the first application included within the user mode of the host operating system to an application framework associated with the guest operating system via a data channel comprising a socket, wherein the application framework calculates rotation of the computing device based on the changed sensor data.

2. The method of claim 1, wherein the sensors include an accelerometer, a magnetometer, and a gyroscope.

3. The method of claim 1, further comprising sending the calculated rotation to a second application associated with the guest operating system.

4. The method of claim 3, wherein the second application is a screen rotation application.

5. The method of claim 1, wherein the guest operating system is an Android operating system.

6. The method of claim 1, wherein the host operating system is a Windows operating system.

7. A computing device having associated sensors, comprising:
    a processor; and
    a memory having stored thereon instructions which, when executed by the processor, cause the processor to perform operations comprising:
    executing a host operating system;
    executing an application for launching a guest operating system, wherein the guest operating system is a virtual operating system and is executed as a guest process of the host operating system, such that the guest operating system does not have access to a driver executing within a kernel of the host operating system;
    responsive to changed sensor data indicative of the rotation event detected by at least one of the sensors, said changed sensor data detected by the driver executing within the kernel of the host operating system, sending the changed sensor data to a first application included within a user mode of the host operating system;
    sending the changed sensor data from the first application included within the user mode of the host operating system to an application framework associated with the guest operating system via a data channel comprising a socket, wherein the application framework calculates rotation of the computing device based on the changed sensor data.

8. The computing device of claim 7, wherein the sensors include an accelerometer, a magnetometer, and a gyroscope.

9. The computing device of claim 7, wherein the operations further comprise sending the calculated rotation to a second application associated with the guest operating system.

10. The computing device of claim 9, wherein the second application is a screen rotation application.

11. The computing device of claim 7, wherein the guest operating system is an Android operating system.

12. The computing device of claim 7, wherein the host operating system is a Windows operating system.

13. A non-transitory computer readable storage device included in a computing device and having instructions encoded thereon which, when executed by a processor, cause the processor to perform operations comprising:
    executing a host operating system;
    executing an application for launching a guest operating system, wherein the guest operating system is a virtual operating system and is executed as a guest process of the host operating system, such that the guest operating system does not have access to a driver executing within a kernel of the host operating system;
    responsive to changed sensor data indicative of the rotation event detected by at least one sensor associated with the computing device, said changed sensor data detected by the driver executing within the kernel of the host operating system, sending the changed sensor data to a first application included within a user mode of the host operating system;
    sending the changed sensor data from the first application included within the user mode of the host operating system to an application framework associated with the guest operating system via a data channel comprising a socket, wherein the application framework calculates rotation of the computing device based on the changed sensor data.

14. The non-transitory computer readable storage device of claim 13, wherein the sensors include an accelerometer, a magnetometer, and a gyroscope.

15. The non-transitory computer readable storage device of claim 13, wherein the operations further comprise sending the calculated rotation from the application framework to a second application associated with the guest operating system.

16. The non-transitory computer readable storage device of claim 15, wherein the second application is a screen rotation application.

17. The non-transitory computer readable storage device of claim 13, wherein the guest operating system is an Android operating system and the host operating system is a Windows operating system.

* * * * *